United States Patent [19]

Knotts

[11] Patent Number: 5,381,704
[45] Date of Patent: Jan. 17, 1995

[54] BEARING TOOTH GEAR

[76] Inventor: Stephen E. Knotts, 14601 NE. 50th Place, #E-1, Bellevue, Wash. 98004

[21] Appl. No.: 75,147

[22] Filed: Jun. 10, 1993

[51] Int. Cl.[6] .................................................. F16H 1/12
[52] U.S. Cl. ........................................ 74/416; 74/465
[58] Field of Search .................. 74/415, 416, 351, 465

[56] References Cited

U.S. PATENT DOCUMENTS

| | | |
|---|---|---|
| 277,802 | 5/1883 | Stanley et al. |
| 486,055 | 11/1892 | Saladee . |
| 596,884 | 1/1898 | Jamieson ............................ 74/416 |
| 613,148 | 10/1898 | Jamieson ............................ 74/416 |
| 620,074 | 2/1899 | Jamieson ............................ 74/416 |
| 633,470 | 9/1899 | McCormick . |
| 638,795 | 12/1899 | Bullis ................................... 74/416 |
| 1,159,486 | 11/1915 | Froelich . |
| 2,792,715 | 5/1957 | Wojtowicz ........................... 74/465 |
| 3,608,392 | 6/1970 | Gilbert ............................... 74/424.5 |
| 3,845,670 | 11/1974 | Grayson ............................... 74/465 |
| 4,093,036 | 6/1978 | Knutson ............................. 180/70 R |
| 4,541,297 | 9/1985 | Fujita ................................. 74/424.6 |
| 4,879,920 | 11/1989 | Kerkhoff ............................. 74/465 |
| 5,197,354 | 3/1993 | Mohr et al. ...................... 74/416 X |

Primary Examiner—Allan D. Herrmann
Attorney, Agent, or Firm—James Richard Vance

[57] ABSTRACT

Apparatus and methods for transmitting rotative forces through a series of meshed gears, comprising a gear system or assembly having at least one gear with a plurality of non-traditional, non-conventional configured teeth that serve as rotatable bearings that contact and engage corresponding teeth of an adjacent gear.

23 Claims, 6 Drawing Sheets

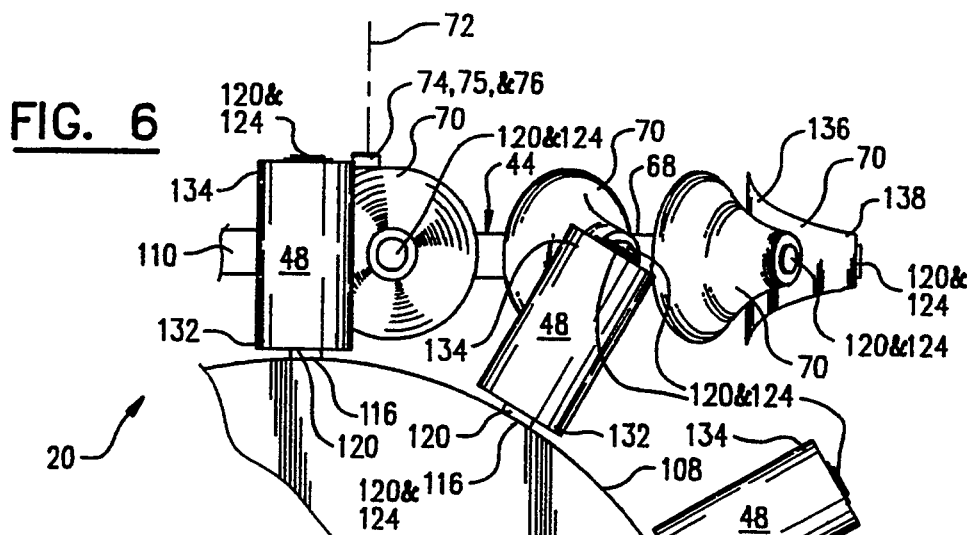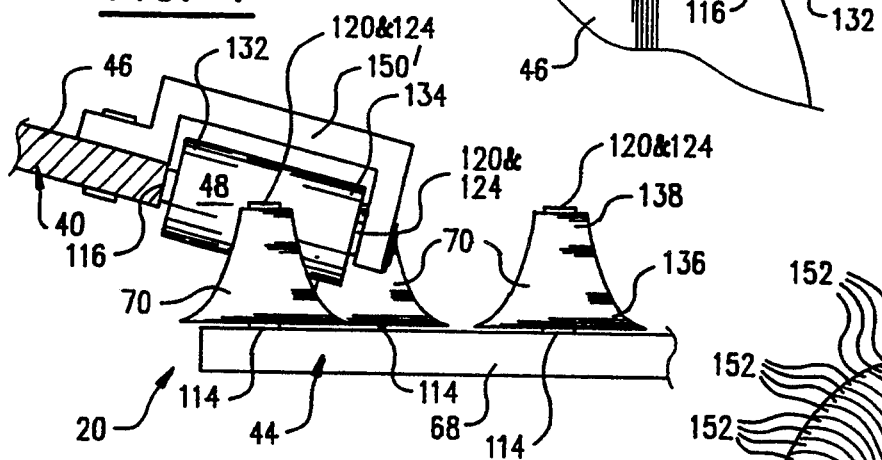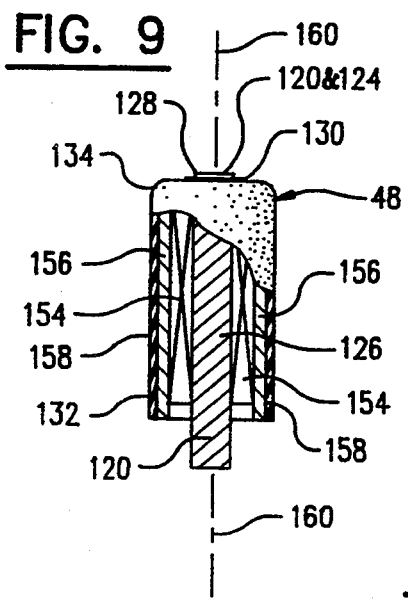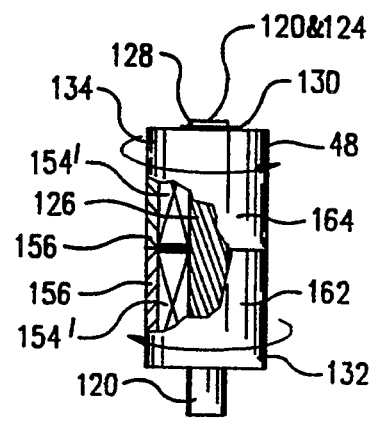

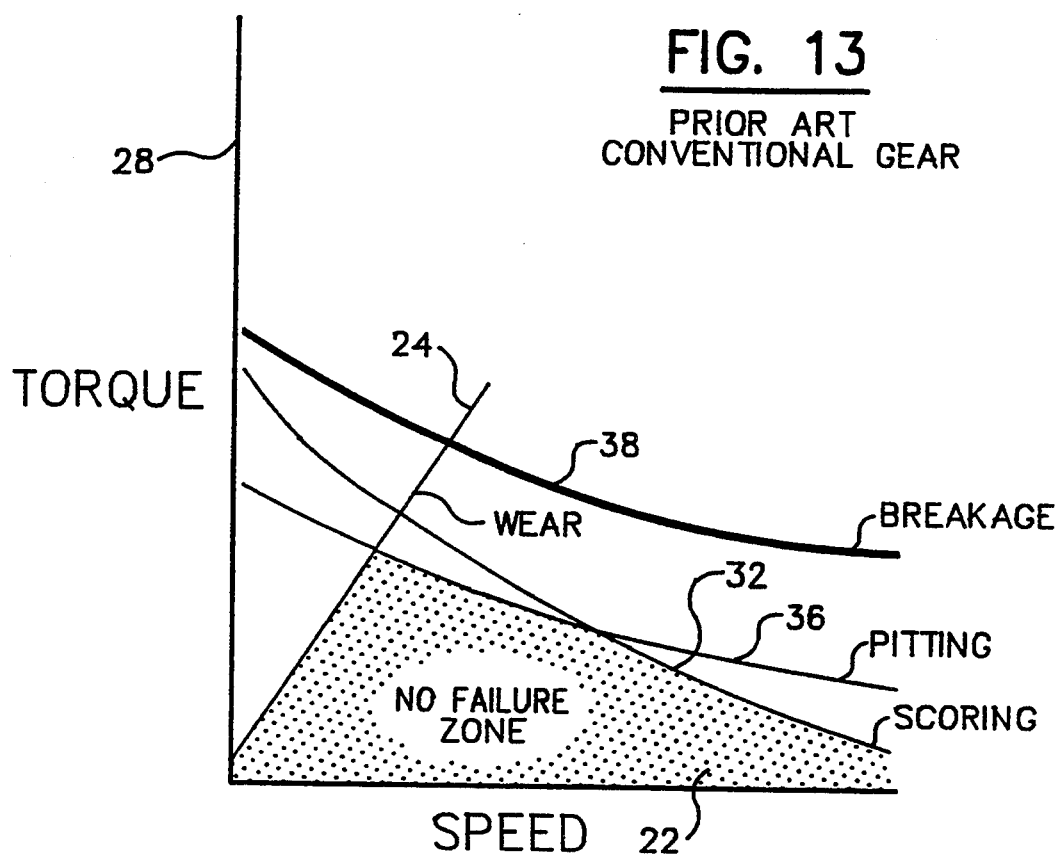
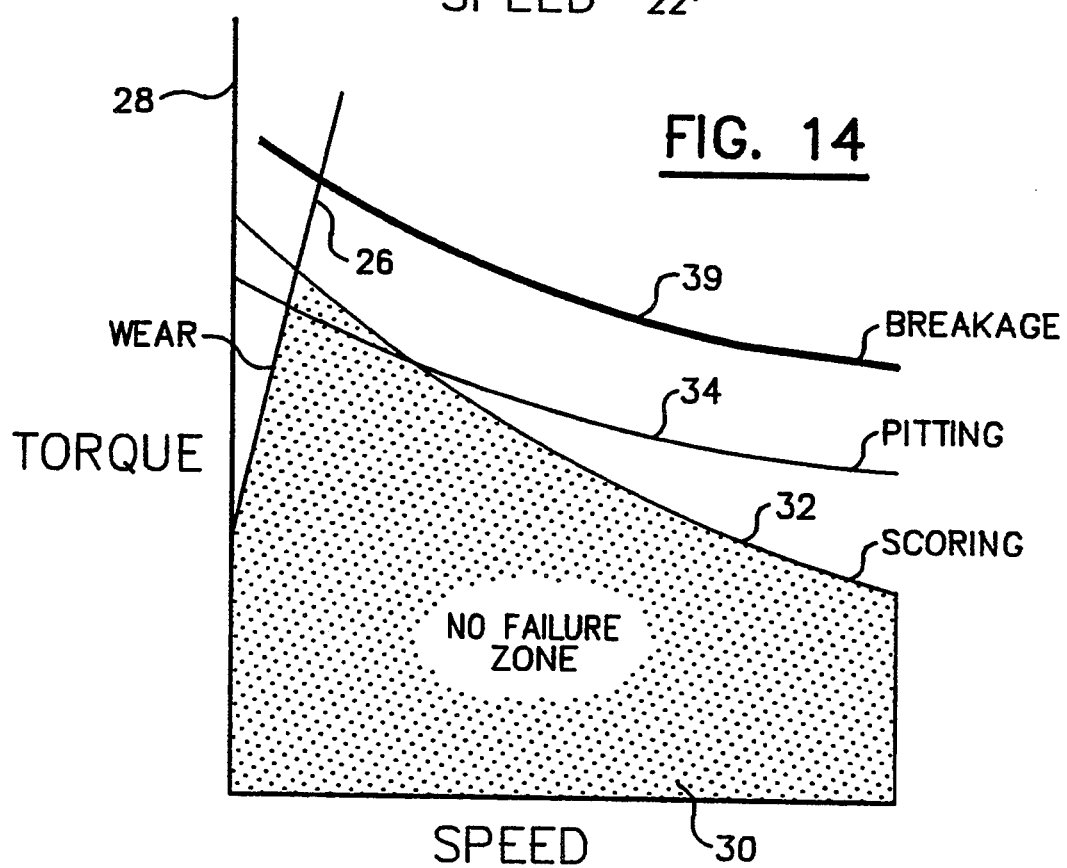

BEARING TOOTH GEAR

COPYRIGHT NOTICE

© Copyright 1993, James R. Vance. All Rights Reserved.

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyrights whatsoever.

1. Technical Field

This invention relates to apparatus and methods for transmitting rotative forces through a series of gears. More particularly, this invention relates to meshed or interlocking gears, wherein the teeth of at least one gear have non-traditional, non-conventional configurations and serve as rotatable bearings that contact and engage corresponding teeth of an adjacent gear.

2. Background Art

For centuries the need for various meshing or interlocking gears has been widely recognized. In an effort to satisfy this need, many differently structured gear systems have been created. For example spur gears, helical gears, worm gears, bevel gears, and hypoid gears are all well known within the mechanical engineering profession and related industries.

Conventional gear technology has changed very little in the past one hundred years. There have been improvements in materials and some tooth geometries, but the basic design remains the same. The basic design of nearly all gears is that mating tooth surfaces slide over one another. To reduce frictional resistance, a lubricant film is often placed between the two sliding tooth surfaces.

The teeth formed within such gears are generally stationary and do not move or rotate with respect to the pinion, sprocket, or wheel.

It is common knowledge that as the intermeshing teeth engage and contact one another, the contacting teeth slide, rub, and rock against each other. For example, on a pair of standard spur gears, the intermeshing teeth engage and slide against one another until a particular location called a pitch line is reached. Thereupon a rolling action between the teeth occurs and sliding begins in a reverse or opposite direction. It is self-evident that the frictional sliding of the teeth against one another wears down the surfaces of the teeth.

There are some, albeit unusual, gear designs that utilize teeth or other means of engagement that incorporate rotatable bearings. The following patents illustrate such gear designs: Stanley et al. (U.S. Pat. No. 277,802; Issued May 15, 1883); Saladee (U.S. Pat. No. 486,055; Issued Nov. 8, 1892); McCormick (U.S. Pat. No. 633,470; Issued Sep. 19, 1899); Froelich (U.S. Pat. No. 1,159,486; Issued Nov. 9, 1915); Wojtowicz (U.S. Pat. No. 2,792,715; Issued May 21, 1957); Gilbert (U.S. Pat. No. 3,608,392; Issued Jun. 15, 1970); Grayson (U.S. Pat. No. 3,845,670; Issued Nov. 5, 1974); Knutson (U.S. Pat. No. 4,093,036; Issued Jun. 6, 1978); Fujita (U.S. Pat. No. 4,541,297; Issued Sep. 17, 1985); and Kerkhoff (U.S. Pat. No. 4,879,920; Issued Nov. 14, 1989).

The inventor believes that the cited disclosures taken alone or in combination neither anticipate nor render obvious the present invention. The foregoing citations do not constitute an admission that such disclosures are relevant or material to the present claims. Rather, such citations relate only to the general field of the present invention.

DISCLOSURE OF INVENTION

The present invention is a simple, easily used, functional, efficient, reliable, rugged, durable, easily constructed, relatively inexpensive and economical to manufacture apparatus and methods for transmitting rotative forces through a series of interlocking gears.

Numerous benefits are derived from this advancement in gear design technology. Frictional losses are reduced. Gear operating properties are improved. Field servicing becomes a viable option. Production costs are dramatically reduces. These advances are obtained by replacing the sliding contact of conventional gear teeth with the rolling contact of specially configured bearing teeth.

To properly grasp the significance of the present invention, one must understand some of the difficulties experienced with the previously known gear systems. For example, there is a point on a spur or helical gear where no sliding occurs. Instead, a rolling action occurs. Such rolling action occurs at a fulcrum or pivot point that is called a "pitch line." Little wear occurs at the pitch line because the two interlocking teeth are in rocking or rolling contact with one another. The sliding velocity is zero.

A graph, that will be discussed in greater detail below, can be made to plot the gear sliding velocity of a tooth as compared to the cross section of the tooth. In general, the sliding velocity increases at distances further out on the tooth structure. The sliding velocity also increases at distances further toward the root or base of the tooth. The sliding velocity, however, is zero at the pitch line point. In essence, the pitch line point serves as a fulcrum. There is no wear at the pitch line, or at least very little in comparison to the sliding wear which occurs elsewhere on the tooth.

One of the benefits of the gear of the present invention is the reduction or elimination of such wear on gear teeth. In other words, one of the main premises of the invention is to replace the aforementioned sliding action within intermeshing gears with a rolling action imparted by bearings. The gear teeth of the present invention actually serve as rotatable bearings that contact corresponding teeth of an adjacent gear. The bearings may also be used to accommodate slight variances in tooth geometry and/or placement.

A further premise or objective of the present invention is to provide gear systems wherein the teeth of at least one intermeshing gear have non-traditional, non-conventional configurations. The purpose of such non-conventional configurations will be described further below.

The gear systems of the present invention may be connected to any desirable support structure. Once a load or other machinery is connected thereto, the present invention operates what initially appears to be in a conventional manner. Use of this invention, however, not only increases the load transmitting capability of the gear system, by assuring constant load bearing contact between one or more intermeshing teeth, this invention also removes and eliminates, or at least significantly reduces, jarring, slippage, and undesired play within the gear system.

To achieve the foregoing objectives, the apparatus or gear assembly of the present invention generally comprises a first gear and a second gear.

The first gear has a first gear plate that is operatively secured to any desired support frame. The support frame should be of sufficient strength and mass to adequately support the operation of the gear assembly. The first gear plate is capable of rotating about a first axis.

A first set of teeth is operatively secured to the first gear plate. Each tooth within the first set of teeth is positioned radially outward from the first axis.

Similarly, the second gear has a second gear plate that is operatively secured to the support frame. The second gear plate is capable of rotating about a second axis.

A second set of gear teeth are operatively secured to the second gear plate. Each tooth within the second set of teeth is positioned radially outward from the second axis.

Please note that the first axis can have a generally parallel orientation to the second axis.

The first axis can also have an orientation that is generally orthogonal to the second axis.

Alternatively, the first axis can have an acute or obtuse orientation with respect to the second axis.

The applicant is unaware of any gear system that allows virtually the same two sets of gear teeth to be effectively used in such a wide variety of orientations.

In the preferred embodiment, one or more teeth within the first set of teeth are rotatively secured to the first gear plate. The individual rotative capability of the teeth within the first set of teeth is not an absolute requirement. The invention can operate even if one or more, including all, of such teeth are fixedly secured to the first gear plate. However, to provide maximum efficiency it is intended that each tooth within the first set of teeth be rotatively secured to the first gear plate.

More particularly, within the preferred embodiment of the invention, one or more teeth within the first set of teeth defines a removable, rotatable bearing that is capable of intermeshing, contacting, and engaging corresponding teeth of the second set of teeth to transmit the rotative forces through the gear train. For example, one or more teeth within the first set of teeth may be provided with a generally cylindrically-shaped configuration. The significance and impact of such cylindrically-shaped configuration as the first set of teeth intermesh with the second set of teeth will be discussed in greater detail further below.

At least one tooth within the second set of teeth is rotatively secured to the second gear plate. In the preferred embodiment of the invention each tooth within the second set of teeth is rotatively secured to the second gear plate. However, for any reason if one or more teeth within the second set of teeth were to cease rotating, the present invention could continue operation, albeit less efficiently.

At least one tooth within the second set of teeth defines a removable, rotatable bearing that is capable of intermeshing, contacting, and engaging corresponding teeth of the first set of teeth to transmit the rotative forces through the gear train.

At least one tooth within the second set of teeth has a generally bell-, conical-, concave-, funnel-, hyperboloid-, hyperbolic paraboloid-, elliptic paraboloid-, or quadric-shaped configuration having a wider base portion positioned nearer to the second gear plate and an opposed narrower end portion positioned away from the second gear plate. In the preferred embodiment of the invention, each tooth within the second set of teeth has a generally bell-shaped configuration. The significance and impact of such bell-shaped configurations as the second set of teeth intermesh with the first set of teeth will be discussed in greater detail further below.

Each tooth of the first set of teeth may be rotatively secured to the first gear plate in such a manner as to be capable of rotating about an axis that is substantially parallel or perpendicular with the first axis. If necessary or desirable, the axis of rotation of such teeth may be either acute or obtuse with respect to the first axis.

Similarly, each tooth of the second set of teeth may be rotatively secured to the second gear plate in such a manner as to be capable of rotating about an axis that is substantially parallel or perpendicular with the second axis. The axis of rotation of such teeth may also be either acute or obtuse with respect to the second axis.

The drawings illustrate embodiments having only parallel or perpendicular orientations.

The invention may further comprise means for changing a position of the first axis with respect to the second axis. The invention may also comprise means for changing a position of the second axis with respect to the first axis and to the support frame. For example, the first gear plate may be provided with a first axle that is either fixedly or rotatively secured to the positional changing means, such as a first adjustment plate. The changing means or adjustment plate is then in turn fixedly or adjustably secured to the support structure. This structure allows the position of the first axle to be moved with respect to the support structure.

Similarly, the second gear plate may be provided with a second axle that is either fixedly or rotatively secured to another positional changing means, or second adjustment plate. This other changing means or adjustment plate is then fixedly or adjustably secured to the support structure. As a result, the second axle can be moved with respect to the support structure.

The positional changing means permit the first and second axis to be adjusted so that they properly intersect one another. Proper intersection of the first and second axes increases the operational efficiency of the invention, if a perpendicular or orthogonal orientation is desired. The positional changing means also permits the first and second axes to be moved toward or away from one another for adjustment of the engagement between the first and second sets of teeth. This is particularly helpful when the first axis and second axis are parallel to one another.

Each tooth within the first set of teeth has a first end, that is positioned nearer to the first gear plate, and an opposed second end, that is positioned away from the first gear plate.

In an enhanced embodiment of the invention, the gear assembly or system is further provided with a first top plate. The first top plate is operatively secured to the second end of each tooth of the first set of teeth. In essence, the first top plate provides additional structural support near the second end of each tooth of the first set of teeth.

The first top plate may be provided with a plurality of protrusions that extend radially outwardly therefrom. Each of the protrusions is operatively secured to the second end of a corresponding tooth of the first set of teeth. The protrusions are configured and spaced to allow unobstructed passage of a tooth of the second set of teeth between adjacent teeth of the first set of teeth.

The apparatus or gear assembly may further have a second top plate that is operatively secured to the narrower end portion of the teeth of the second set of teeth. The second top plate provides additional structural support near the narrower end portions of the second set of teeth.

The second top plate may also be provided with a plurality of protrusions that extend radially outwardly therefrom. Each of the protrusions are operatively secured to the narrower end portion of a corresponding tooth of the second set of teeth. The protrusions are similarly configured and spaced to allow unobstructed passage of a tooth of the first set of teeth between adjacent teeth of the second set of teeth.

If the axis of rotation of the teeth of the first set of teeth is perpendicular to the axis of rotation of the first gear plate, then a support brace may be provided to engage and support the outwardly projecting or second end of each tooth. The support brace may simply comprise an angle iron that is secured to the first gear plate and projects outwardly to engage and support the second end of the tooth. Alternatively, the first gear plate may be formed to have such structural bracing formed integrally therein.

The second gear plate and second set of teeth may similarly be provided with additional support bracing.

In an alternative embodiment of the invention, at least one tooth of the second set of teeth has a plurality of facets thereon or formed therein. Such facets may define a generally serpentine path along at least one tooth of the second set of teeth. Without such facets, point contacts are generated between the engaged first and second sets of teeth. However, if such facets are used, line contacts are formed between the engaged first and second sets of teeth. Use of line contacts enables the gear assembly to have a greater contact surface area. This in turn enables the gear assembly to handle greater loads, and the chances of pitting or other wear of the gear teeth are even further reduced. The serpentine path of the facets is intended to track the same rotational motion of the second set of teeth as they engage the first set of teeth, thereby maintaining contact without any slippage between the contacting teeth.

In a further alternative embodiment of the invention, one or more teeth of the first set of teeth is provided with a bearing that is concentric with and rotatable about a centrally located axle or shaft. In this embodiment of the invention, such tooth is not dependent upon a rotatable axle or shaft. Instead, the axle or shaft is fixedly secured to either the support structure or to the positional changing means. The rotatable bearing that is operatively secured to the axle or shaft actually defines the gear tooth. It is intended that such rotatable bearing have roller bearings or another form of friction reducing means therein.

The rotatable bearing or tooth may also be provided with a sleeve or outer-coating that is made of a resilient and/or shock absorbent material. Such material enables the gear assembly to absorb any shock loading that may occur within the system. In addition, such material absorbs and accommodates any play or slack that might occur, such as may occur if the axes of the teeth are not perfectly aligned or if there are any discrepancies in the cross-sectional areas of the teeth.

Incorporation of a sleeve into the structure of the tooth also enables a single size of rotatable bearing or tooth to be used and sleeves having the needed cross-sectional areas can be inserted thereon. Thus, a user of this gear system may easily and quickly repair and/or modify the gear system or obtain a needed replacement part by combining a standardized bearing or tooth with an appropriately sized sleeve. Means for securing the sleeve to the rotatable bearing may also be provided.

In an even further embodiment of this invention, one or more teeth of the first set of teeth may have two or more collinear segments that are capable of independent rotation about the axis of that tooth.

For example, if a particular cylindrical tooth is contacted by both adjacent bell-shaped teeth on either side, then the cylindrical tooth might be urged in different directions at different phases of engagement through the engagement stroke. If this is to occur, then the cylindrical tooth may be provided with two collinear segments. The first collinear segment, that is positioned closest to the first gear plate, rotates in a first direction during the initial, first phase of engagement with the second set of teeth. As the tooth passes into the second phase of engagement, the second or bell-shaped tooth moves upwardly along the first or cylindrical tooth leaving the first collinear segment and engaging the second collinear segment. The second collinear segment will then rotate in an opposite direction than that of the first collinear segment. Consequently, in this embodiment of the invention, each tooth can build up angular momentum that increases the operational efficiency of the gear assembly. Similarly, each of the bell-shaped teeth may be provided with a split tooth design.

Please note that in the preferred embodiment, the tooth spacing is such that each tooth is capable of obtaining and maintaining angular momentum.

In an alternative embodiment of the invention, both the first and second sets of teeth have generally bell-shaped configurations. In particular, one or more teeth within the first set of teeth is provided with a generally bell-shaped configuration, with a wider base portion positioned nearer to the first gear plate and an opposed narrower end portion positioned away from the first gear plate.

The present invention enables a single gear system to be configured in numerous different ways. To further facilitate this objective, the first and second gear plates may be proved with means whereby their respective gear teeth may be secured thereto at a wide variety of different locations. For example, a pair of first and second gear plates may have bore holes therein that are positioned to accommodate axles for gears having one, two, three, four, five, six, seven, eight, or more teeth that are positioned equal distances about the axis of rotation. Furthermore, such gear teeth may be placed at different distances from the axis of rotation and the first and second gear plates have means therein to accommodate such placement.

These and other objectives and advantages of the present invention will become more readily apparent upon reading the following disclosure and referring to the attached drawings. The following text and drawings also greatly expand upon and further explain the foregoing elements.

BRIEF DESCRIPTION OF DRAWINGS

FIG. 6 is a partial, side-elevational view of a fourth embodiment of the invention, wherein the teeth of both sets of gears are mounted upon an edge of their respective gear plates and extend radially therefrom.

FIG. 7 is a partial, cross-sectional, side-elevational view of a fifth embodiment of the invention, wherein the teeth of a first gear are mounted upon the edge of a first gear plate and extend radially therefrom. The teeth of the first gear are further provided with support bracing. The teeth of a second gear are mounted upon the planar surfaces of a second gear plate.

FIG. 8 is an isometric view of a sixth embodiment of the invention, wherein a generally bell-shaped gear tooth is provided with serpentine faceted surfaces thereon.

FIG. 9 is a partial, cross-sectional, side-elevational view of a seventh embodiment of the invention, illustrating an alternative cylindrical tooth structure.

FIG. 10 is a partial, cross-sectional, side-elevational view of an eight embodiment of the invention, wherein the cylindrical tooth comprises the combination of two collinear bearings that are juxtaposed close to one another and are capable of rotating in opposite directions to each other.

FIG. 13 is a prior art graph depicting the various modes of failure for conventional gear system.

FIG. 14 is a revised graph depicting the estimated changes to the failure limits for the present invention.

Figure 1:
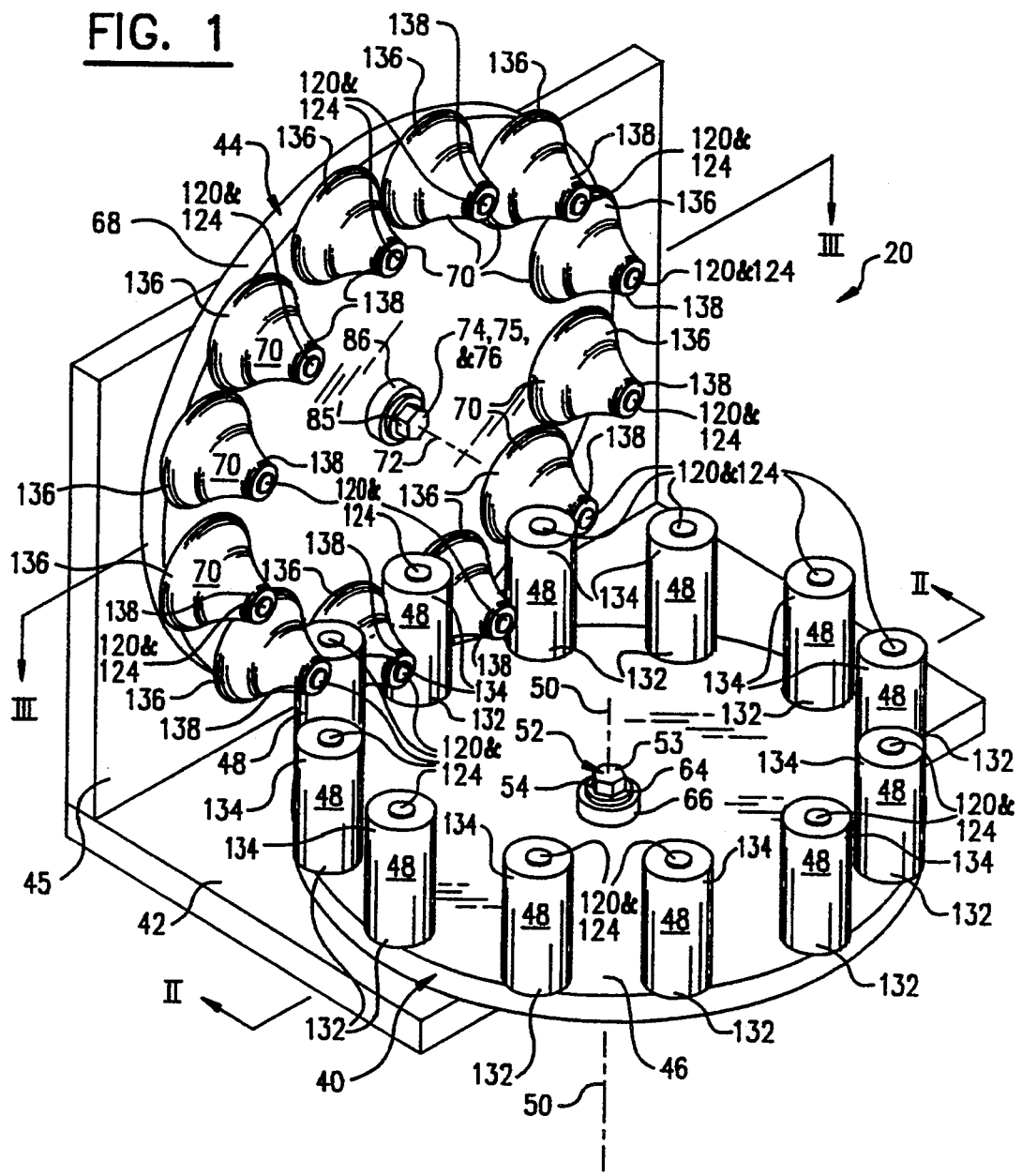
FIG. 1 is an isometric view of a first embodiment of the present invention illustrating a first gear and a second gear that intermesh with one another.

One should understand that the drawings are not necessarily to scale and the elements are sometimes illustrated by graphic symbols, phantom lines, diagrammatic representations, and fragmentary views. In certain instances, the inventor may have omitted details that are not necessary for an understanding of the present invention or that render other details difficult to perceive.

BEST MODE FOR CARRYING OUT THE INVENTION

Referring to the drawings, wherein like numerals indicate like parts, the present invention is a bearing gear assembly 20 that may be used to transmit a rotative force through a gear train. Assembly 20 represents a new type of gear technology that significantly diverges from conventional gear design. The present invention will be better understood by first comparing assembly 20 to conventional gear systems.

As discussed above, the sliding velocity of a conventional spur or helical gear is zero at the pitch line. The sliding velocity increases dramatically as the contact point departs from the pitch line. Mechanical engineers know that there is a vast difference between rolling and sliding friction. The frictional coefficient for surfaces in sliding contact will vary from 0.05 for a well-lubricated gear to 0.3 for a poorly lubricated gear. In comparison, the frictional coefficient for a commercial ball bearing is 0.01, compared to the frictional coefficient of a cylinder rolling over a plane which is 0.00001.

The frictional coefficient for assembly 20 is much more similar to that of a cylinder rolling over a plane than to a poorly lubricated gear. In other words, by simply viewing the respective frictional coefficients of assembly 20 to that of a poorly lubricated gear, there is an approximate 30,000 times improvement.

Conventional gears experience predominantly sliding contact. With proper workmanship, materials, and lubrication, frictional losses can be reduced to acceptable levels. A standard spur or bevel gear is approximately 96 to 99 percent efficient.

However, if the sliding contact of a conventional gear is replaced with a rolling contact, the frictional loses decrease 100 to 1,000 times. Consequently, besides the beneficial effects such operation has upon the gear itself, the energy savings can be substantial over the lifetime of a gear train.

Rudimentary comparison experiments between assembly 20 to that of a comparable, conventional bevel gear set, with each gear being positioned at a 90 degree angle to each other, reveal that given an equivalent impulse to cause rotation, assembly 20 rotates nearly twice as long, or longer, before stopping due to frictional resistance than does the bevel gear.

A conventional gear tooth has rolling contact only at the pitch line.

In comparison, the teeth of assembly 20 have rolling contact throughout their entire engagement. Pure rolling contact positively affects all forms of gear tooth failure.

There are basically four types of tooth failure: wear, scoring, pitting, and tooth breakage.

Referring to FIG. 13, a shaded area 22 defines a "no failure" zone or envelope. If a gear set is operated outside failure zone 22, one or more of the aforesaid failures will occur.

For example, conventional gear sets wear when the lubricant film is penetrated and gear teeth surfaces contact one another. Penetration occurs from low lubricant viscosity, high tooth loading, and/or from low contact speeds. The rate of wear adversely increases as heat is developed and the viscosity of the lubricant decreases. As penetration occurs, the contact area between the engaged gear teeth increases. This causes further heating and lubricant thinning. If lubrication is lost in a conventional gear train, even for a short duration, irreparable damage to the gears can result. A wear line 24 for a conventional gear system is illustrated in FIG. 13.

Assembly 20 does not require the use of a surface lubricant. The elimination of this requirement is achieved because of the elimination of sliding contact between the engaged gear teeth. Consequently, there is no lubricant film to break through and no viscosity to decrease. Continual attention to the level of lubricant is no longer necessary. Maintenance requirements are decreased, and the cost to service assembly 20, i.e., purchase and supervise maintenance of the lubricant, is decreased.

By employing the features of this invention, a resulting wear line 26 of the present invention is positively increased as illustrated in FIG. 14. The slope of wear line 26 increases, translating up a torque axis 28 to further increase no failure zone 30.

As with wear, scoring is a result of lubricant film breakdown. As the lubricant film breaks down, metal-to-metal contact results and frictional heating can increase to a point of causing micro welding between the engaging teeth. Once scoring begins, material is rapidly removed from the tooth surface and the gear soon fails. A standard score line 32 for a conventional gear system is illustrated in FIG. 13.

As can be seen in FIG. 14, scoring limit line 32 for assembly 20 is moved substantially outward as compared to scoring limit line 32 for a conventional gear as shown in FIG. 13. As a consequence, the area of no failure zone 30 for assembly 20 is greatly increased.

Failure due to scoring is greatly reduced, if not completely eliminated, for assembly 20 as a result of using the technology taught herein. Frictional heating from a rolling bearing tooth is so low that any heat generated is easily dissipated during operation of assembly 20. Consequently, surface welding temperatures are never reached.

Pitting results from the cyclical over stressing of the tooth surface. If a tooth surface is over stressed repetitively, micro cracks form, grow, and join until a small piece of material breaks free to form a pit. The type of material forming the tooth, the amount and repetitive nature of the loading, and the effectiveness of the lubricants can all affect the pitting process.

Unlubricated bearing teeth that have rolling contact will not suffer from crack propagation. As seen in FIG. 14, pitting limits 34 of assembly 20 are substantially different from pitting limits 36 of a conventional gear, as shown in FIG. 13. Consequently, the area of no failure zone 30 again increases.

In addition, the bearing teeth of assembly 20 may be formed of materials, such as elastomers, that are impervious to pitting.

Tooth breakage occurs from overloading, sudden shock loading, and material fatigue. Tooth size and the material from which the tooth is made are critical factors in determining tooth breakage of a conventional gear. Tooth breakage 38 of a conventional gear is illustrated in FIG. 13.

Conventional gear teeth are rather poor load carrying structures. The standard gear tooth is essentially a highly loaded cantilevered beam. Highly stressed teeth require use of a high strength alloy, such as heat treated steels. Heat treated steels, however, sacrifice durability for greater strength. Consequently conventional gear teeth are quite brittle and tooth breakage or failure is a very common problem.

Assembly 20 does not require the use of heat treated steels. Instead, gear assembly 20 is specifically designed to carry heavy loads, withstand sudden shock loading, and eliminate material fatigue problems. As a result, breakage limit 39, as seen in FIG. 14, increases. Larger tooth structures can be made without the worry of driving the other failure modes.

In summary, the bearing teeth of assembly 20 will allow all of the failure limit lines in FIG. 13 to increase. It is anticipated that upon closer evaluation some of the failure modes illustrated in FIG. 14 will actually be eliminated for the present invention. Increasing the failure limits will allow the creation of gear sets that have greater load capacity and that are more tolerant of adverse conditions and environments.

The attention of the reader is now drawn to FIGS. 1 through 14.

FIG. 1 illustrates a first embodiment of the invention, wherein a first gear 40 is operatively secured to a first support frame 42. A second gear 44 is similarly secured to a second support frame 45. First support frame 42 and second support frame 45 may comprise the same structure. During operation of assembly 20, first gear 40 intermeshes and engages second gear 44.

First gear 40 generally comprises a planar first gear plate 46 or pin-wheel and a plurality of pins or teeth 48 that extend outwardly therefrom. Teeth 48 combine to define a first set of teeth.

First gear plate 46 is operatively secured to first support frame 42 in such a manner that first gear plate 46 is generally free to rotate about a first axis 50. In the preferred embodiment of the invention, a first bolt 52, shaft, or rod is attached or secured to first support frame 42. First bolt 52 has a head 53 located at a first end 54 and a series of threads 56 located at an opposed second end 58. A mated threaded nut 60 or end cap may be removably attached to the threaded second end 58.

First gear plate 46 is provided with a centrally located bore hole 62. Similarly, first support frame 42 is also provided with a bore hole 63.

If frictional resistance is not of great concern to the operator of assembly 20, bore hole 62 may have a diameter that approximates or is slightly larger than a diameter of first bolt 52. Bore holes 62 and 63 are aligned, and first bolt 52 is simply passed or inserted therethrough. Nut 60 is then secured to second end 58 of first bolt 52. Washers 64 or other friction reducing hardware may also be used.

Once placed in position, first gear plate 46 is permitted to freely rotate about first bolt 52. When so secured, first bolt 52 defines first axis 50 of rotation of first gear plate 46.

Figure 5:
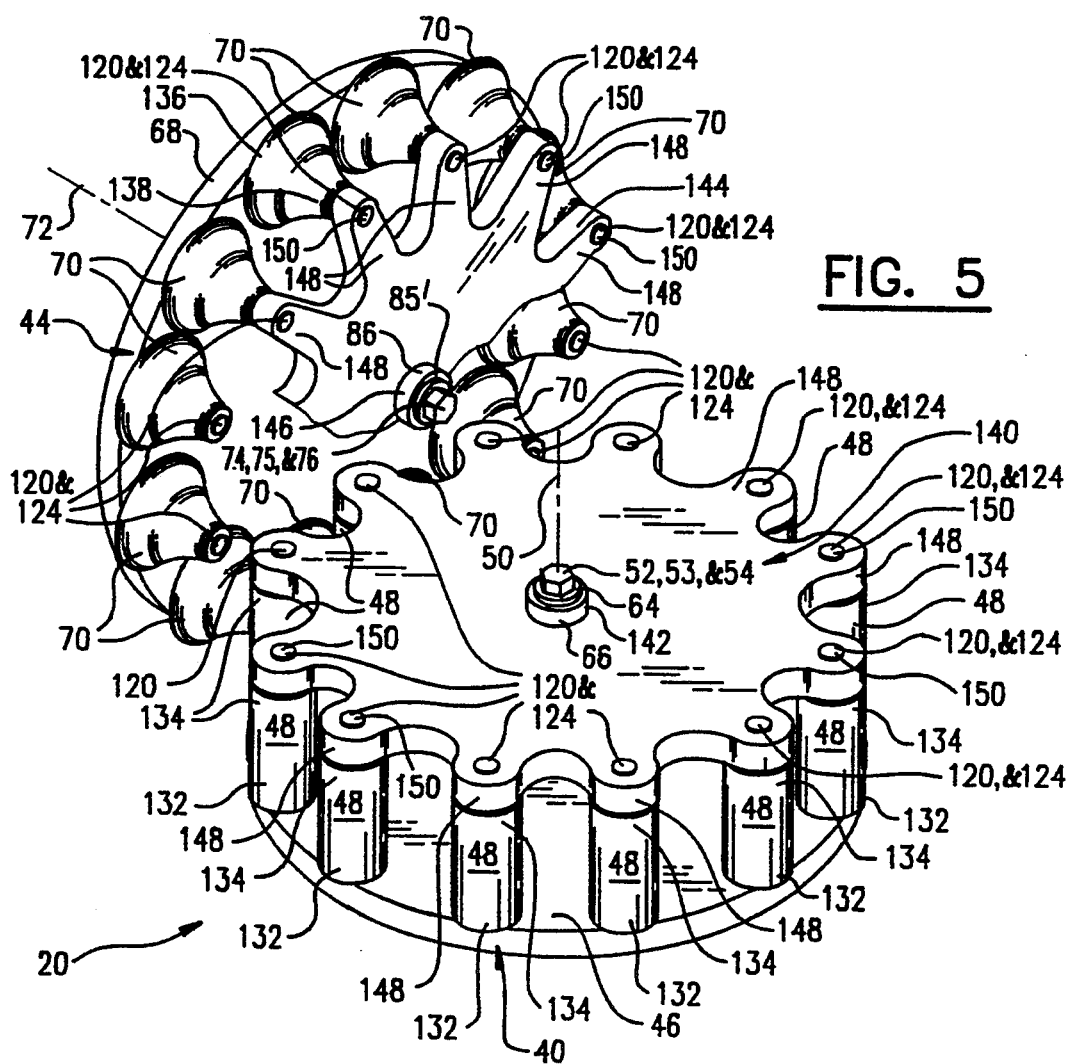
FIG. 5 is a partial, isometric view of a third embodiment of the invention, wherein the first gear and second gear illustrated in FIGS. 1 through 3 are further provided with a first top plate and a second top plate, respectively.
Figure 12:
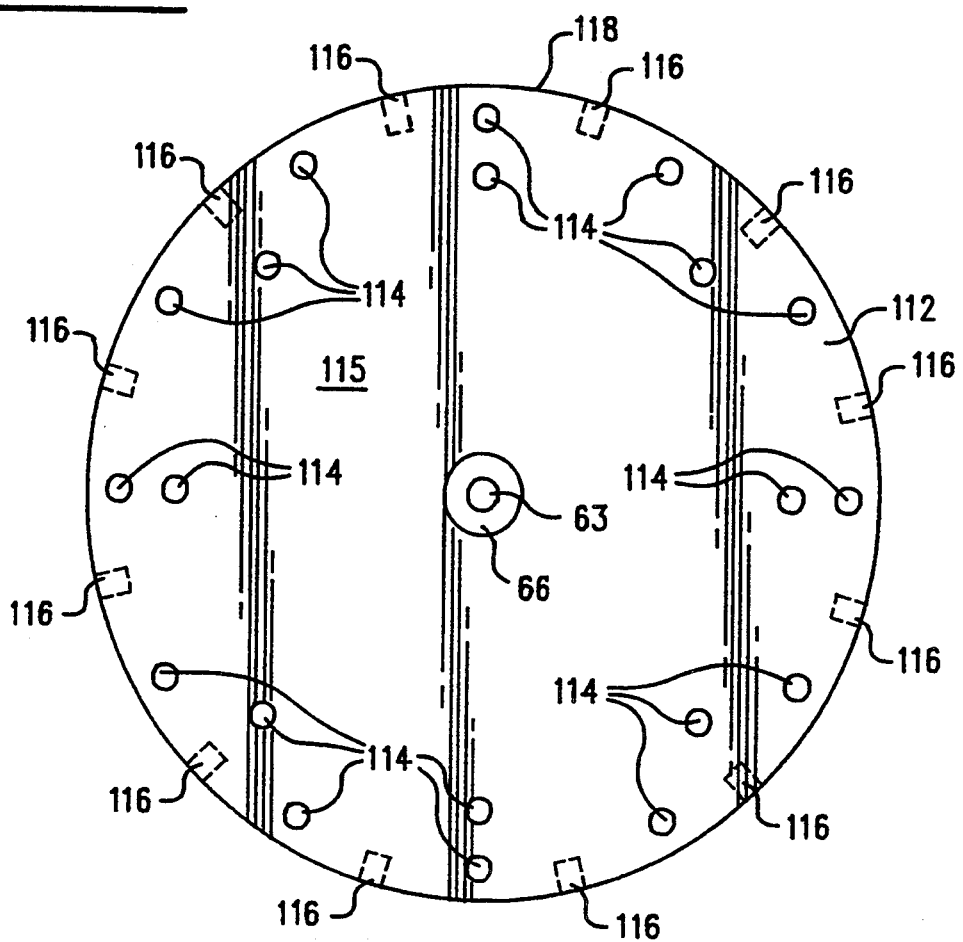
FIG. 12 is a plan view of an alternative gear plate having multiple sets of openings or attachment points therein.

In an alternative and preferred embodiment of the invention, a reduction of frictional resistance is important. Consequently, bore hole 62 is enlarged to accommodate the placement and housing of a first bearing 66, the outer walls of which are attached or secured to first gear plate 46. First bearing 66 is illustrated in FIGS. 1, 5, and 12. A compression fit may be sufficient to secure first bearing 66 to first gear plate 46, and/or to first top plate 140 which will be discussed below. An interior opening of first bearing 66 is of appropriate size and dimension to allow first bolt 52 to pass therethrough. Nut 60 is secured to second end 58 in a conventional manner. Again, when so secured, first bolt 52 defines first axis 50 of rotation of first gear plate 46.

Second gear 44 generally comprises a planar second gear plate 68 or pin-wheel and a plurality of pins or teeth 70 that extend outwardly therefrom. Teeth 70 combine to define a second set of teeth.

Second gear plate 68 is operatively secured to second support frame 45 in such a manner that second gear plate 68 is generally free to rotate about a second axis 72. In the preferred embodiment of the invention, a second bolt 74, shaft, or rod is attached or secured to second support frame 45. Second bolt 74 has a head 75 located at a first end 76 and a series of threads 78 located at an opposed second end 80. A second mated threaded nut 82 or end cap may be removably attached to the threaded second end 80.

Second gear plate 68 is provided with a centrally located bore hole 84. Similarly, second support frame 45 is also provided with a bore hole 85.

If frictional resistance is not of great concern to the operator of assembly 20, bore hole 84 may have a diameter that approximates or is slightly larger than a diameter of second bolt 74. Bore hole 84 and bore hole 85 are aligned, and second bolt 74 is passed or inserted therethrough. Second nut 82 is then secured to second end 80 of second bolt 74. Washers 85' or other friction reducing hardware may also be used.

Once placed in position, second gear plate 68 is permitted to freely rotate about second bolt 74. When so secured, second bolt 74 defines second axis 72 of rotation of second gear plate 68.

Figure 2:
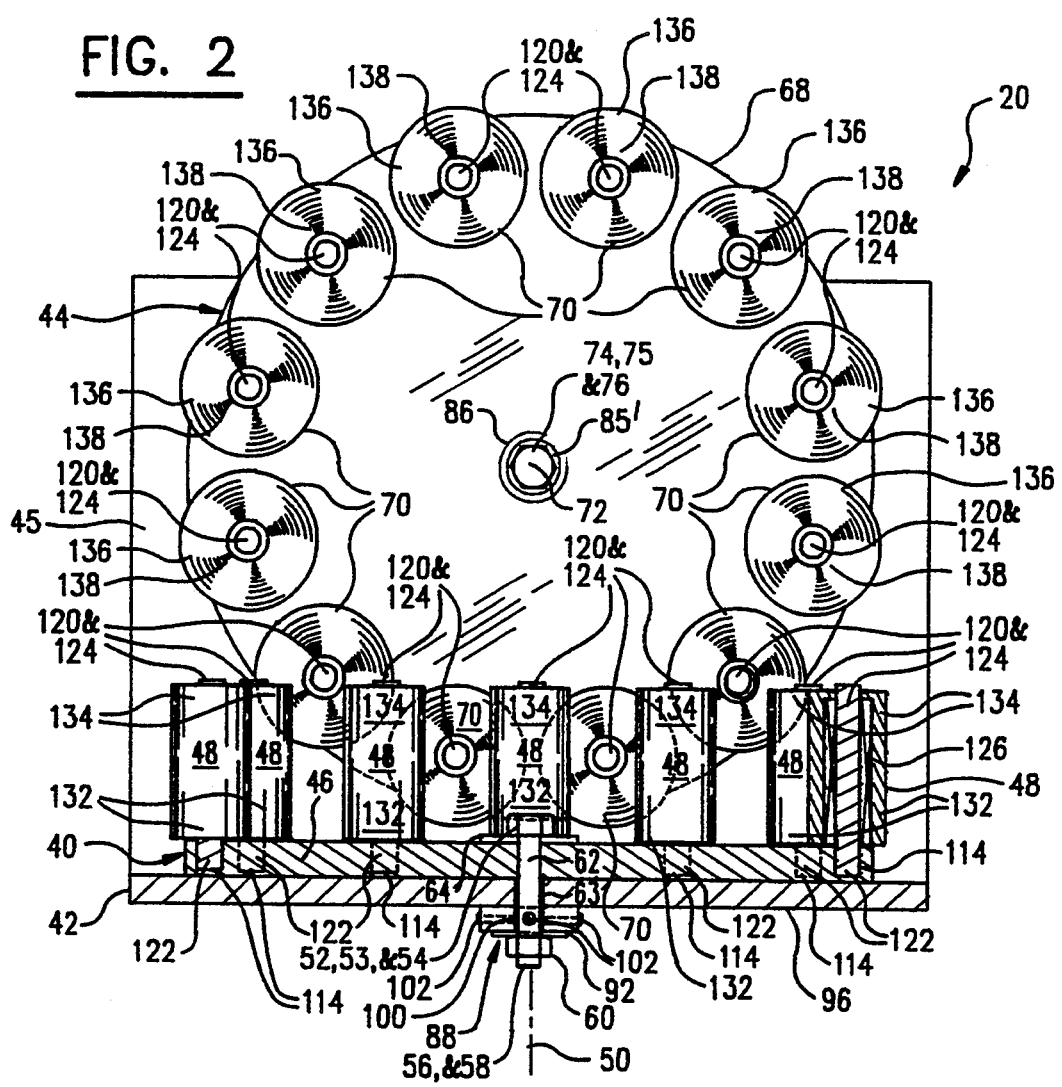
FIG. 2 is a partial, cross-sectional, side-elevational view of the first embodiment of the invention as viewed from a plane identified by line II—II in FIG. 1.

As state above, in the preferred embodiment of the invention, a reduction of frictional resistance is important. Consequently, bore hole 84 can be enlarged to accommodate the placement and housing of a second bearing 86, the outer walls of which are attached or secured to second gear plate 68. Second bearing 86 is illustrated in FIGS. 1, 2, and 5. A compression fit may be sufficient to secure second bearing 86 to second gear plate 68. An interior opening of second bearing 86 is of appropriate size and dimension to allow second bolt 74 to pass therethrough. Second nut 82 is secured to second end 80 in a conventional manner. Again, when so secured, second bolt 74 defines second axis 72 of rotation of second gear plate 68.

To obtain an enhanced efficiency of assembly 20, a ray passing through first axis 50 should intersect with a ray passing through second axis 72. To achieve these ends and to facilitate slight adjustment and realignment of first axis 50 with respect to second axis 72, means 88 is provided. Similarly, means 90 for changing a position of second axis 72 with respect to first axis 50 may also, or alternatively, be provided.

Figure 3:
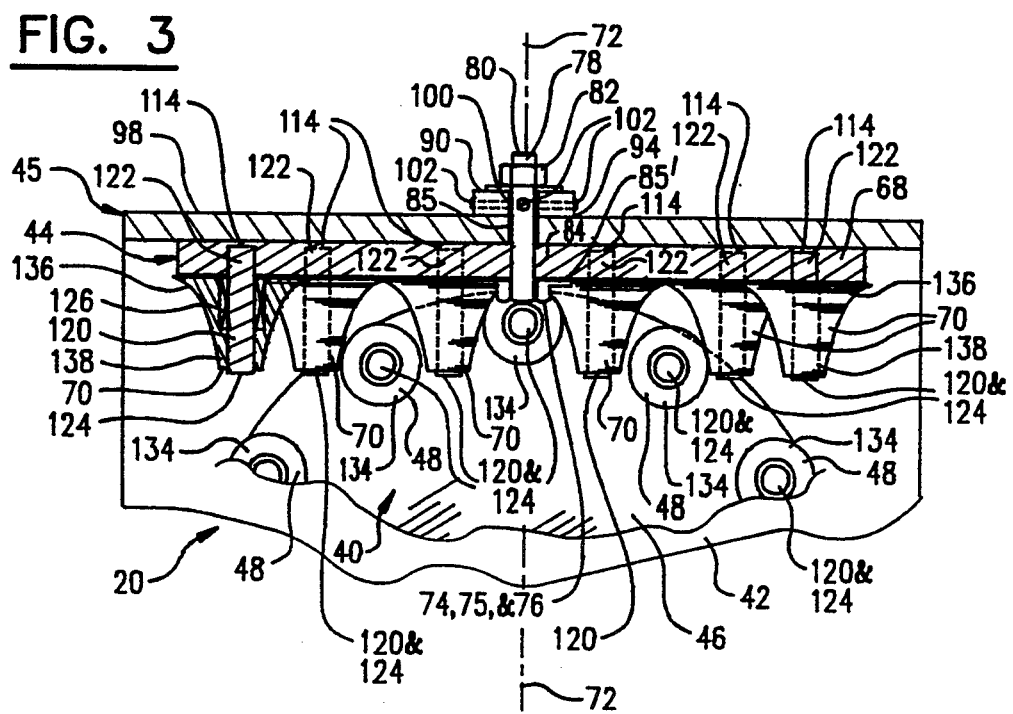
FIG. 3 is a partial, cross-sectional, plan view of the first embodiment of the invention as viewed from a plane identified by line III—III in FIG. 1.

In the preferred embodiment of the invention, positional changing means 88 and 90 comprise a first adjustment plate 92 and a second adjustment plate 94 that are respectively secured to the respective reverse or back sides 96 and 98 of first and second support frames 42 and 45. FIG. 2 illustrates first adjustment plate 92 positioned on reverse or back side 96 of first support frame 42. FIG. 3 illustrates second adjustment plate 94 positioned on reverse or back side 98 of second support frame 45.

Located within first and second adjustment plates 92 and 94 are collets or sleeves 100 whose longitudinal axis can be moved and adjusted by rotating adjustment screws 102. As illustrated in FIG. 2, first bolt 52 passes through and is secured within first adjustment plate 92. Similarly, FIG. 3 illustrates second bolt 74 passing through and being secured within second adjustment plate 94.

In essence, first and second adjustment plates 92 and 94 allow fine adjustment of the relative position of first axis 50 with respect to second axis 72. By causing axis 50 of first gear plate 46 to be coplanar to axis 72 of second gear plate 68, undesired sliding and rocking between the various intermeshing pins or teeth can be eliminated.

Figure 4:
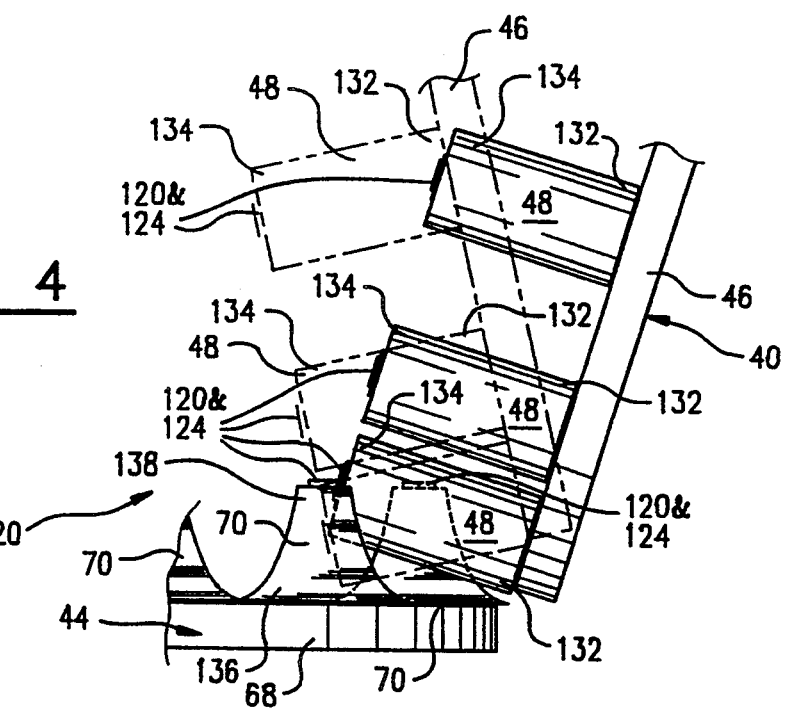
FIG. 4 is a partial, side-elevational view of a second embodiment of the invention, wherein the first and second gears illustrated in FIGS. 1 through 3 are oriented at other than an orthogonal angle to one another.

Within FIG. 1, first support frame 42 has a generally orthogonal orientation with respect to second support frame 45. Other orientations, such as those that impart an acute or obtuse, or even parallel, angle of orientation between first support frame 42 and second support frame 45 may be used. The resulting effect of altering the angle of orientation of the first and second support frames 42 and 45 is illustrated in FIG. 4.

For example, first gear plate 46 can be angled toward second gear plate 68 so that the angle between first and second gear plates 46 and 68 is less than ninety degrees (90°). A relative angle of less than ninety degrees (90°) is illustrated in phantom lines within FIG. 4.

Alternatively, first gear plate 46 can be angled away from second gear plate 68 so that the angle between first and second gear plates 46 and 68 is greater than ninety degrees. A relative angle of greater than ninety degrees is illustrated in solid lines within FIG. 4.

Each tooth 48 is rotatably secured to first gear plate 46 in such a manner that each tooth 48 is capable of rotating about an axis that is substantially parallel or perpendicular with first axis 50. FIGS. 1, 2, 3, 4, 5, and 11 illustrate teeth 48 having a substantially parallel orientation with respect to first axis 50. The inventor prefers that teeth 48 have a substantially parallel orientation with respect to first axis 50. However, FIGS. 6 and 7 illustrate alternative embodiments wherein teeth 48 have a substantially perpendicular orientation with respect to first axis 50.

Similarly, each tooth 70 is rotatably secured to second gear plate 68 in such a manner that each tooth 70 is capable of rotating about an axis that is substantially parallel or perpendicular with second axis 72. FIGS. 1, 2, 3, 4, 5, and 11 illustrate teeth 70 having a substantially parallel orientation with respect to second axis 72. The inventor prefers that teeth 70 have a substantially parallel orientation with respect to second axis 72. However, FIG. 6 illustrates an alternative embodiment wherein teeth 70 have a substantially perpendicular orientation with respect to second axis 72. In other words, the fourth embodiment illustrated in FIG. 6 is contrasted to the first, second, and third embodiments of FIGS. 1 through 5, wherein gear teeth 48 and 70 are mounted upon the planar surfaces of the first and second gear plates 46 and 68, respectively.

More particularly, FIG. 6 illustrates teeth 48 being mounted upon an edge 108 of first gear plate 46 and teeth 70 being mounted upon an edge 110 of second gear plate 68. FIG. 12 further illustrates a "universal" gear plate 112 that not only has receiving holes 114, openings, or attachment points for several different sets of teeth on its planar surface 115, but also has receiving holes 116 positioned about its edge 118. Such multiple sets of receiving holes 116 enable gear plate 112 to be used for a wide variety of different gear ratios and different gear teeth positioning.

In the preferred embodiment, receiving holes 114 and/or 116 comprise threaded bore holes that are formed within first gear plate 46 and second gear plate 68.

Machined bearing posts 120 or rods each having a threaded end 122 and an opposed locking end 124 are used to mount teeth 48 and teeth 70 to first gear plate 46 and to second gear plate 68, respectively. Threaded end 122 is inserted into and threadably engaged within threaded bores or receiving holes 114. The direction of the threads should take into consideration the expected rotational direction of each tooth 48 and/or 70 to prevent loosening of bearing posts 120 from the first and/or second gear plates 46 and 68.

Each tooth 48 and 70 is provided with a centrally located receiving bore hole 126 therein that is appropriately sized and dimensioned to accommodate the effective placement of each tooth 48 and 70 over a respective bearing post 120. Receiving bore holes 126 are illustrated in FIGS. 2, 3, 9, and 10. If desired, a washer (not shown) may be placed about the bearing post 120 between tooth 48 and first gear plate 46 and/or between tooth 70 and second gear plate 68.

Locking end 124 of each bearing post 120 should extend beyond the outermost surface of teeth 48 and/or teeth 70.

Within the preferred embodiment of the invention, locking end 124 is provided with means to prevent the undesired escape of teeth 48 and 70 therefrom. For example, each locking end 124 may be provided with a circumferential slot or channel 128 within which a spring clip 130 may be engaged. Channel 128 and spring clip 130 are illustrated in FIGS. 9 and 10.

In the preferred embodiment of the invention, each tooth 48 within the first set of teeth has an elongated cylindrical shape. Each tooth 48 has a first end 132 positioned near to first gear plate 46 and an opposed second end 134 positioned away from first gear plate 46. Each tooth 48 is mounted upon a bearing post 120 and extends outwardly from first gear plate 46.

In the preferred embodiment of the invention, each tooth 70 within the second set of teeth has a generally conical, funnel, or bell shape. Each tooth 70 has a wider base portion 136 positioned nearer to second gear plate 68 and has an opposed narrower end portion 138 positioned away from second gear plate 68. Each tooth 70 is also mounted upon a bearing post 120 and extends outwardly from second gear plate 68.

FIGS. 1, 2, 3, 4, 5, 6, and 7 illustrate how the cylindrically-shaped teeth 48 interface and engage the bell-shaped teeth 70.

It is particularly important to note that as first gear plate 46 is rotated, a portion of teeth 48 nearer to the outermost second end 134 initially contacts the narrower end portion 138 of teeth 70. In this manner, teeth 48 begin to engage and drive teeth 70 long before their counterparts in conventional gear design.

As first gear plate 46 further rotates, the contact point between teeth 48 and teeth 70 graduates down toward first end 132, positioned adjacent to first gear plate 46, and simultaneously graduates down toward wider base portion 136, positioned adjacent to second gear plate 68. As a result, load forces on the cantilevered bearing teeth 48 and 70 are focused toward their strongest location, that being closest to their respective gear plates.

Please also note that as engagement occurs, the geometric design of each tooth meshes almost perfectly with the oppositely engaged tooth to virtually eliminate binding and to remain in contact through the entire driving stroke. Contact between engaged teeth 48 and teeth 70 remains continuous through the entire intermeshing pass or stroke.

The bell shape of teeth 70 is actually defined by the intermeshing relationship between the engaging teeth. Consequently, if the number or spacing of teeth 48 and 70 were to change, the optimal configuration of the bell-shaped tooth 70 would most likely also change.

As first gear plate 46 continues through the remainder of the pass or stroke, for a particular set of intermeshing teeth 48 and 70, the contact point between teeth 48 and 70 moves away from both first gear plate 46 and second gear plate 68 until the portion of teeth 48 nearer to the outermost second end 134 disengages contact with the narrower end portion 138 of teeth 70. This configuration allows teeth 48 of gear assembly 20 to continue to engage and drive teeth 70 long after their counterparts in conventional gear design have ceased to have contact.

In fact, if machined properly, two or more teeth 48 of this invention can actually engage and drive teeth 70 at the same time, thereby distributing the load forces over a greater number of load bearing teeth. This feature further distinguishes the present invention over all of the heretofore known gear systems. We can not overemphasize that this technology is a significant breakthrough in gear design.

The configuration of teeth 70, within the initial prototype of the invention, was determined by a combination of mathematical calculations confirmed and revised from evaluating empirical data. The closest mathematical formulas to describe the desired configuration of tooth 70, to date, are:

$$A = \arctan[(-B\cos(15+C)/(D\sin C) + 1/(\tan C)] \quad (1)$$

$$E = D + F - (D\cos C + F\sin A) \quad (2)$$

$$G = B\sin(15+C) - D\sin C - F\cos A \quad (3)$$

wherein:
- A = contact angle of bell-shaped tooth
- B = radius of second gear plate from second axis to axis of bell-shaped bearing tooth
- C = rotation angle of first gear plate
- D = radius of first gear plate from first axis to axis of cylindrical-shaped bearing tooth
- E = height of bell-shaped bearing tooth
- F = radius of cylindrical-shaped bearing tooth
- G = local radius of bell-shaped bearing tooth Furthermore, another significant attribute of the invention is the ease in which teeth 48 and 70 can be serviced. What previously has been a burdening and costly chore of servicing machinery now can be performed with relative ease and significantly reduced expense. The present invention even allows assembly 20 to be serviced on site in the field. A set of bearing teeth 48 and/or teeth 70 can simply be replaced in a very short amount of time.

The servicing of conventional gears is quite a different matter. Due to the impracticalities of performing proper welding and heat treating within the field, the whole gear must be removed and shipped to a repair facility. Performing routine maintenance is a very time consuming and costly procedure for large conventionally designed gears. "On the shelf" replacement gears are rarely available for large gear sets. If an operator of essential machinery procrastinates necessary servicing until a catastrophic failure occurs, a particular machine needing immediate repair can be nonfunctional and inoperative for 3 or more weeks while reworking is being performed.

With the present invention, replacement parts for such machinery can be specifically designed to function as failure points. Since standard bearing teeth 48 and 70 can be stocked or quickly machined, essential equipment no longer needs to suffer long downtimes. Servicing costs are also much lower than would occur with conventional gear systems.

Operators and technicians no longer are required to handle the repair of large, unique, bulky, and heavy parts. Instead, the present invention provides replacement parts that are relatively small and can be standardized for particular needs.

With the reduced service time and related costs, operators will be more likely to perform needed periodic maintenance instead of waiting for the inevitable, unpredictable emergency downtime.

The mobile and removable teeth 48 and 70 offer other advantages that should be discussed. Bearing teeth 48 and 70 are relatively simple machined or turned parts. The first and second gear plates 46 and 68 can be manufactured from inexpensive castings. In addition, the cost of scrapping a rejected bearing tooth 48 or 70 is many times less expensive and troublesome that scrapping an entire conventional gear.

Bearing teeth 48 and 70 can also be manufactured from elastomers, plastics, and even high cost alloys that would otherwise be cost prohibitive for a complete convention gear. Due to the rolling characteristics of elastic material that can be easily used to manufacture teeth 48 and 70, binding becomes an impossibility. Consequently, backlash is now eliminated. A very quiet gear set can be made if non-metallic materials and other possible damping features are employed.

As illustrated in FIGS. 1, 2, 3, 4, 6, and 11, teeth 48 and 70 are cantilevered outward from their respective first and second gear plates 46 and 68.

FIGS. 5 and 7, however, illustrate alternative embodiments wherein both ends of teeth 48 and 70 are supported.

Bearing teeth 48 and 70 of assembly 20 need not be cantilevered beams. As illustrated in FIGS. 5 and 7, both ends of the bearing shaft or post 120 can be supported. This additional structure further increases the breakage limit of assembly 20.

For example, as illustrated in FIG. 5, a first top plate 140 can be operatively secured to locking end 124 of each bearing post 120 secured to first gear plate 46. First bolt 52 can be lengthened to pass through a bore hole 142 located within the center of first top plate 140.

Similarly, a second top plate 144 can be operatively secured to locking end 124 of each bearing post 120 secured to second gear plate 68. Second bolt 74 can be lengthened to pass through a bore hole 146 located within the center of second top plate 144. FIG. 5 is partially sectioned to illustrate the underlying tooth interface.

First and second top plates 140 and 144 thereby impart greater structural integrity and strength to gear assembly 20. Consequently, first and second intermeshing teeth 48 and 70 can carry a greater load.

In the preferred embodiment, first and second top plates 140 and 144 have portions removed therefrom to form a general star-shape. In other words, first and second top plates 140 and 144 are each provided with a plurality of protrusions 148 that extend radially outward from the center of each top plate 140 and 144. Locking ends 124 are received into bore holes 150 located in each protrusion 148.

In essence, the removed portions of first and second top plates 140 and 144, that create protrusions 148, accommodate the passage of subsequently engaged teeth 48 and 70 into the intermeshing or engagement area. The removal of such portions is particularly important because bearing teeth 48 and 70 are significant longer than the teeth of a conventional gear. If such portions were not removed, the bearing teeth 48 and 70 that are needed to enter into the engagement area might otherwise become entangled against first and/or second top plates 140 and 144. Other configurations of top plates 140 and 144, of course, can be used to avoid the aforesaid problem.

In an alternative or fifth embodiment of the invention, as illustrated in FIG. 7, bearing teeth 70 are mounted upon the planar upper surface of second gear plate 68. Teeth 48, however, are mounted upon the peripheral edge 108 of first gear plate 46. Additional structural support bracing in the general form of a C-bracket or J-bracket 150' are provided to support the second end 134 of tooth 48. Use of J-bracket 150', or other structure that accomplishes the same purpose, imparts greater structural integrity and strength to each tooth 48 thereby enabling such teeth to carry greater loads. In addition, use of J-brackets 150' permit the free intermeshing and engagement of teeth 48 and 70 without interfering therewith.

Referring to the sixth embodiment of the invention, as shown in FIG. 8, the generally bell-shaped bearing tooth 70 can be provided with a plurality of faceted surfaces 152. Faceted surfaces 152 enable bearing tooth 70 to glide and rotate into proper engagement with tooth 48 without sliding against one another. In other words, the intermeshing bearing teeth 48 and 70 engage and contact each other along a line rather than at a point. Consequently, there is less of a likelihood that bearing teeth 48 and 70 will slip or rub against each other during contact. This further reduces any likelihood that excessive wear and/or slack within the gear system would occur. As teeth 48 and 70 engage each other, such teeth drop into an engaged position and rotate with each other traveling down one of the spline-like or faceted surfaces 152. This movement is contrasted to movement of other teeth that can randomly travel down and engage one another.

Faceted surfaces 152 may also take the form of a helical or other configured serpentine path down the length or height of bell-shaped tooth 70. Such a path further assists proper engagement between teeth 70 with teeth 48.

FIG. 9 illustrates a partially cross-sectioned, cut away, side-elevational view of a seventh embodiment of the invention, wherein an alternative cylindrical tooth 48 structure is shown. More particularly, FIG. 9 illustrates a partial cutaway view of a cylindrical tooth 48 having an elongated central post 120, an elongated rotatable bearing 154 surrounding and operably connected to post 120, an outer skin portion, coating, or housing 156 surrounding rotatable bearing 154, and a permanent and/or removable plastic, elastomeric, or rubber outer coating or jacket 158. Each of the foregoing elements of cylindrical tooth 48 are concentric about a common axis 160.

FIG. 10 illustrates a partially cross-sectioned, cut away, side-elevational view of an eighth embodiment of the invention, wherein cylindrical tooth 48 comprises a combination of a first bearings 162 that is collinear with a second bearing 164. Bearings 162 and 164 are juxtaposed adjacent to one another. However, each bearing 162 and 164 is capable of rotating independently from the other. This embodiment is referred to as a split tooth.

In many ways, bearings 162 and 164 have similar structure to that depicted in FIG. 9. For example, each of bearings 162 and 164 have an elongated central post 120, an elongated rotatable bearing 154' surrounding and operably connected to post 120, and an outer skin portion, coating, or housing 156 surrounding rotatable bearing 154'.

As mentioned above, given particularly geometries such as tooth spacing and/or contact, when tooth 48 engages tooth 70 at a nonstandard angle, a portion of tooth 48 could pivot in a first direction and then pivot in a second, reverse direction. To avoid tooth wear that could occur with such gear movement, the embodiment depicted in FIG. 10 uses a split tooth configuration having two (2) sets of rotatable geared teeth 162 and 164. Consequently, this structure eliminates reverse sliding. In other words, without the split tooth design, when tooth 48 rotates, tooth 48 might be forced to actually reverse its rotational direction as it is passing through its course. However, with the split tooth design, only the portion of tooth 48 that would actually rotate would do so without having to reverse directions.

Another added benefit to this embodiment is that each portion of tooth 48 can accumulate angular momentum. Consequently, the machinery is not called upon to urge tooth 48 into rotation. In essence, tooth 48 absorbs less energy and may even contribute to the energy contained within the system during periods of varied loads.

Similarly, bell-shaped tooth 70 could also have a split tooth design, if needed or desired.

The preferred embodiment of the invention, as illustrated in FIG. 1, does not require the use of a split tooth design. However, each of teeth 48 and 70 can still obtain beneficial angular momentum.

Figure 11:
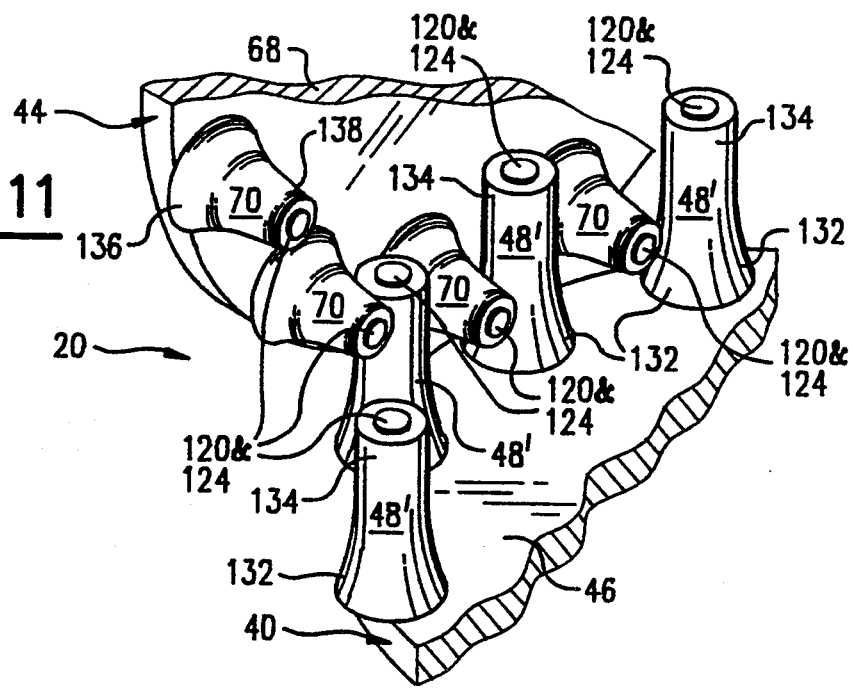
FIG. 11 is a partial, isometric view of a ninth embodiment of the invention, wherein both sets of gears are provided with gear teeth having a generally bell shape configuration.

As seen in FIG. 11, both teeth sets 48' and 70 may be formed to have a general bell-shape or configuration. Rather than having one gear have bell-shaped teeth and another gear have cylindrically-shaped teeth, as found in the first embodiment of the invention, both sets of teeth have generally similar geometry. One will note, however, that the bearing surfaces of teeth 48' and 70 of this embodiment will have a greater degree of concavity than will those of the first embodiment.

Teeth 48 and 70 may have even further configurations and shapes as described above.

It is also important to note that since the lubricant, if any is used, is positioned within the bearing located within an interior cavity of teeth 48 and 70, the exterior or exposed surfaces of assembly 20 remain relatively clean during operation. As a result, assembly 20 is ideal for use in environments that require a high degree of sanitation and cleanliness. For example, assembly 20 could be very effectively used within food manufacturing and processing industries, within surgical environments, and the like.

The means and construction disclosed herein are by way of example and comprise primarily the preferred forms of putting the invention into effect. Although the drawings depict the preferred embodiment of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

The present invention includes functional, reliable, efficient, durable, rugged, easily used and constructed, and relatively inexpensive and economical to manufacture apparatus and methods for transmitting rotative forces through a series of meshed, interlocking gears. The teeth of at least one of the meshed gears have a non-traditional, non-conventional configuration and serve as rotatable bearings that contact and engage corresponding teeth of an adjacent gear.

The present invention increases the speed and simplifies the manufacture, use, cleaning, and repair of gear systems. This invention also greatly reduces or eliminates frictional rubbing and sliding between engaged teeth that so often irreparably damage gear systems. This invention also greatly increases the convenience for operators of the gear system because one or more teeth can be quickly and easily replaced without requiring complete dismantling of the entire system and causing significant inoperative "downtime" while the broken or worn part is specially ordered and/or manufactured. This feature alone dramatically increases the reliability and versatility of the invention over the heretofore known gear systems.

The present invention also maintains proper engagement between the meshed teeth, virtually eliminating backlash. Consequently, the invention is ideal for use within machinery that requires use of highly precise gear trains.

Various features of alternative embodiments of the present invention also provide a gear system that is shock absorbent, resilient, sturdy, and durable, and that minimizes, if not eliminates, breakage and increases the accuracy and reliability of the gear train within which it is used.

I claim:

1. A gear assembly for transmitting rotative forces through a gear train, said assembly being operatively mounted to a support frame, said assembly comprising:
    (a) a first gear having
        (i) a first gear plate operatively secured to the support frame, said first gear plate being capable of rotating about a first axis,
        (ii) a first set of teeth operatively secured to said first gear plate, each tooth within said first set of teeth being positioned radially outward from said first axis; and
    (b) a second gear having
        (i) a second gear plate operatively secured to the support frame, said second gear plate being capable of rotating about a second axis,
        (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate, wherein at least one tooth within said first set of teeth is rotatively secured to said first gear plate, wherein at least one tooth within said first set of teeth defines a removable, rotatable bearing capable of intermeshing, contacting, and engaging corresponding teeth of said second set of teeth to transmit the rotative forces through the gear train, wherein at least one tooth of said first set of teeth has a generally bell-shaped configuration with a wider base portion positioned nearer to said first gear plate and an opposed narrower end portion positioned away from said first gear plate, wherein at least one tooth within said second set of teeth has a generally cylindrically-shaped configuration.

2. The assembly as in claim 1, wherein said first axis is generally orthogonal to said second axis.

3. The assembly as in claim 1, wherein said first axis has an acute orientation with respect to said second axis.

4. The assembly as in claim 1, wherein said first axis has an obtuse orientation with respect to said second axis.

5. The assembly as in claim 1, wherein said first axis is generally parallel to said second axis.

6. The assembly as in claim 1, wherein at least one tooth within said first set of teeth is rotatively secured to said first gear plate in such a manner as to be capable of rotating about an axis that is substantially parallel with said first axis.

7. The assembly as in claim 1, wherein at least one tooth within said first set of teeth is rotatively secured to said first gear plate in such a manner as to be capable of rotating about an axis that is substantially perpendicular to said first axis.

8. The assembly of claim 7 wherein at least one tooth of said first set of teeth is supported at both of its opposed ends.

9. The assembly as in claim 1, wherein at least one tooth within said second set of teeth is rotatively secured to said second gear plate in such a manner as to be capable of rotating about an axis that is substantially parallel with said second axis.

10. The assembly as in claim 1, wherein at least one tooth within said second set of teeth is rotatively secured to said second gear plate in such a manner as to be capable of rotating about an axis that is substantially perpendicular to said second axis.

11. The assembly as in claim 1, wherein at least one tooth of said first set of teeth has a first end positioned nearer to said first gear plate and an opposed second end positioned away from said first gear plate, said assembly further having a first top plate operatively secured to said second end of said tooth of said first set of teeth, said first top plate providing additional support near said second end of said tooth of said first set of teeth.

12. The assembly of claim 11, wherein said first top plate has a plurality of protrusions that extend radially outwardly therefrom, each of said protrusions being operatively secured to said second end of a corresponding tooth of said first set of teeth, said protrusions being configured and spaced to allow unobstructed passage of a tooth of said second set of teeth between adjacent teeth of said first set of teeth.

13. The assembly as in claim 1, wherein said assembly further has a second top plate operatively secured to said narrower end portion of at least one tooth of said second set of teeth, said second top plate providing additional support near said narrower end portion of said tooth of said second set of teeth.

14. The assembly of claim 13, wherein said second top plate has a plurality of protrusions that extend radially outwardly therefrom, each of said protrusions being operatively secured to said narrower end portion of a corresponding tooth of said second set of teeth, said protrusions being configured and spaced to allow unobstructed passage of a tooth of said first set of teeth between adjacent teeth of said second set of teeth.

15. The assembly as in claim 1, wherein at least one tooth of said first set of teeth is provided with a bearing that is concentric with and rotatable about a centrally located shaft.

16. A gear assembly for transmitting rotative forces through a gear train, said assembly being operatively mounted to a support frame, said assembly comprising:
   (a) a first gear having
      (i) a first gear plate operatively secured to the support frame, said first gear plate being capable of rotating about a first axis,
      (ii) a first set of teeth operatively secured to said first gear plate, each tooth within said first set of teeth being positioned radially outward from said first axis;
   (b) a second gear having
      (i) a second gear plate operatively secured to the support frame, said second gear plate being capable of rotating about a second axis,
      (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate; and
   (c) means for changing a position of said first axis with respect to said second axis.

17. A gear assembly for transmitting rotative forces through a gear train, said assembly being operatively mounted to a support frame, said assembly comprising:
   (a) a first gear having
      (i) a first gear plate operatively secured to the support frame, said first gear plate being capable of rotating about a first axis,
      (ii) a first set of teeth operatively secured to said first gear plate, each tooth within said first set of teeth being positioned radially outward from said first axis;
   (b) a second gear having
      (i) a second gear plate operatively secured to the support frame, said second gear plate being capable of rotating about a second axis,
      (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate; and (c) means for changing a position of said second axis with respect to said first axis and to the support frame.

18. A gear assembly for transmitting rotative forces through a gear train, said assembly being operatively mounted to a support frame, said assembly comprising:
   (a) a first gear having
      (i) a first gear plate operatively secured to the support frame, said first gear plate being capable of rotating about a first axis,
      (ii) a first set of teeth operatively secured to said first gear plate, each tooth within said first set of teeth being positioned radially outward from said first axis; and
   (b) a second gear having
      (i) a second gear plate operatively secured to the support frame, said second gear plate being capable of rotating about a second axis,
      (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate, wherein at least one tooth of said second set of teeth has a plurality of facets thereon.

19. The assembly of claim 18, wherein said facets form a generally serpentine path along at least one tooth of said second set of teeth.

20. A gear assembly for transmitting rotative forces through a gear train, said assembly being operatively mounted to a support frame, said assembly comprising:
   (a) a first gear having
      (i) a first gear plate operatively secured to the support frame, said first gear plate being capable of rotating about a first axis,
      (ii) a first set of teeth operatively secured to said first gear plate, each tooth within said first set of teeth being positioned radially outward from said first axis; and
   (b) a second gear having
      (i) a second gear plate operatively secured to the support frame, said second gear plate being capable of rotating about a second axis,
      (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate, wherein at least one tooth within said first set of teeth is rotatively secured to said first gear plate, wherein at least one tooth of said first set of teeth is provided with a bearing that is concentric with and rotatable about a centrally located shaft, wherein at least one tooth of said first set of teeth is provided with a sleeve or outer-coating that is resilient and shock absorbent.

21. Gear assembly for transmitting rotative forces through a gear train, said assembly being operatively mounted to a support frame, said assembly comprising:
   (a) a first gear having
      (i) a first gear plate operatively secured to the support frame, said first gear plate being capable of rotating about a first axis,
      (ii) a first set of teeth operatively secured to said first gear plate, each tooth within said first set of teeth being positioned radially outward from said first axis; and
   (b) a second gear having
      (i) a second gear plate operatively secured to the support frame, said second gear plate being capable of rotating about a second axis,
      (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate, wherein at least one tooth within said first set of teeth is rotatively secured to said first gear plate, wherein at least one tooth of said first set of teeth has at least two collinear segments that are capable of rotating in opposite directions to one another.

22. A gear assembly for transmitting rotative forces through a gear train, said assembly being operatively mounted to a support frame, said assembly comprising:
   (a) a first gear having.
      (i) a first gear plate operatively secured to the support frame, said first gear plate being capable of rotating about a first axis,
      (ii) a first set of teeth operatively secured to said first gear plate, each tooth within said first set of teeth being positioned radially outward from said first axis; and (b) a second gear having
  (i) a second gear plate operatively secured to the support frame, said second gear plate being capable of rotating about a second axis,
  (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate, wherein said first gear plate has means whereby said first set of teeth may be secured to said first gear plate at a variety of different locations thereon.

23. A gear assembly for transmitting rotative forces through a gear train, said assembly being operatively mounted to a support frame, said assembly comprising:
  (a) a first gear having
    (i) a first gear plate operatively secured to the support frame, said first gear plate being capable of rotating about a first axis,
    (ii) a first set of teeth operatively secured to said first gear plate, each tooth within said first set of teeth being positioned radially outward from said first axis; and
  (b) a second gear having
    (i) a second gear plate operatively secured to the support frame, said second gear plate being capable of rotating about a second axis,
    (ii) a second set of teeth operatively secured to said second gear plate, each tooth within said second set of teeth being positioned radially outward from said second axis, at least one tooth within said second set of teeth being rotatively secured to said second gear plate, at least one tooth within said second set of teeth defining a removable, rotatable bearing capable of intermeshing, contacting, and engaging corresponding teeth of said first set of teeth to transmit the rotative forces through the gear train, at least one tooth within said second set of teeth having a generally bell-shaped configuration with a wider base portion positioned nearer to said second gear plate and an opposed narrower end portion positioned away from said second gear plate, wherein said second gear plate has means whereby said second set of teeth may be secured to said second gear plate at a variety of different locations thereon.

* * * * *